United States Patent
Wang et al.

(10) Patent No.: US 12,256,002 B2
(45) Date of Patent: Mar. 18, 2025

(54) PHYSIMETRIC-BASED DATA SECURITY FOR CODED DISTRIBUTED TEMPERATURE SENSING

(71) Applicant: NEC Laboratories America, Inc., Princeton, NJ (US)

(72) Inventors: Qiang Wang, Princeton, NJ (US); Junqiang Hu, Davis, CA (US); Jian Fang, Princeton, NJ (US); Yaowen Li, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 17/589,863

(22) Filed: Jan. 31, 2022

(65) Prior Publication Data
US 2022/0247562 A1 Aug. 4, 2022

Related U.S. Application Data

(60) Provisional application No. 63/145,740, filed on Feb. 4, 2021.

(51) Int. Cl.
*H04L 9/32* (2006.01)
*G01K 11/32* (2021.01)
*H04L 9/06* (2006.01)

(52) U.S. Cl.
CPC .............. *H04L 9/32* (2013.01); *G01K 11/32* (2013.01); *H04L 9/0618* (2013.01)

(58) Field of Classification Search
CPC ........... H04L 9/32; H04L 9/0618; H04L 9/06; G01K 11/32
See application file for complete search history.

(56) References Cited

FOREIGN PATENT DOCUMENTS

| CA | 3031991 A1 | * | 2/2018 | ............... A61N 5/06 |
|---|---|---|---|---|
| CN | 106840450 A | * | 6/2017 | |
| CN | 110763363 A | * | 2/2020 | |
| CN | 117955096 A | * | 4/2024 | |
| JP | 7175489 B2 | * | 11/2022 | ............... A61B 6/00 |

* cited by examiner

*Primary Examiner* — Jayesh M Jhaveri
(74) *Attorney, Agent, or Firm* — Joseph Kolodka

(57) ABSTRACT

Physimetric-based data security for coded distributed temperature sensing (DTS) in which physimetric information is extracted from a coded-DTS interrogator which is unique for each interrogator at each operating run time—and used to reconstruct a final temperature determination from DTS data. The physimetric information includes coded-DTS pulse code and coded-DTS pulse profile information as a key to permit secure sharing with authorized users. The pulse code and pulse profile information are encrypted and made available to an authorized user. The authorized user can then decrypt the pulse code and pulse profile information and subsequently use this key information (pulse profile and pulse code files) to retrieve temperature information from for example, a remote computer providing a continuous raw data feed—without being susceptible to eavesdropping. The pulse profile and pulse code files permit reconstruction of temperature from DTS continuous raw data feed which have no meaningful informational value to an eavesdropper who has no access to the unencrypted pulse profile and pulse code information.

3 Claims, 6 Drawing Sheets

PHYSIMETRIC-BASED DATA SECURITY FOR CODED DISTRIBUTED TEMPERATURE SENSING

CROSS REFERENCE TO RELATED APPLICATIONS

This application claims the benefit of U.S. Provisional Patent Application Ser. No. 63/145,740 filed 4 Feb. 2021 the entire contents of which is incorporated by reference as if set forth at length herein.

TECHNICAL FIELD

This disclosure relates generally to distributed optical fiber sensing (DOFS). More particularly, it pertains to the methods and apparatus for physimetric-based data security for coded distributed temperature sensing (DTS).

BACKGROUND

As will be understood by those skilled in the art, it is a critical technical challenge for service providers to secure distributed temperature sensing services and data. Accordingly, systems and methods that provide secure DTS services and/or DTS data would represent a welcome addition to the art.

SUMMARY

An advance in the art is made according to aspects of the present disclosure directed to physimetric-based data security for coded distributed temperature sensing (DTS).

In sharp contrast to the prior art, our inventive systems and methods employ physimetric information extracted from an interrogator—which may be unique for each interrogator at each operating run time—and used to reconstruct a final temperature determination from DTS data.

Viewed from one aspect, our inventive method and apparatus utilizes DTS pulse code and pulse profile information as a key to permit secure sharing with authorized users. Operationally, an authorized user can use this key information (pulse profile and pulse code files) to retrieve temperature information from for example, a remote computer providing a continuous raw data feed—without being susceptible to eavesdropping.

BRIEF DESCRIPTION OF THE DRAWING

A more complete understanding of the present disclosure may be realized by reference to the accompanying drawing in which.

Figure 1:
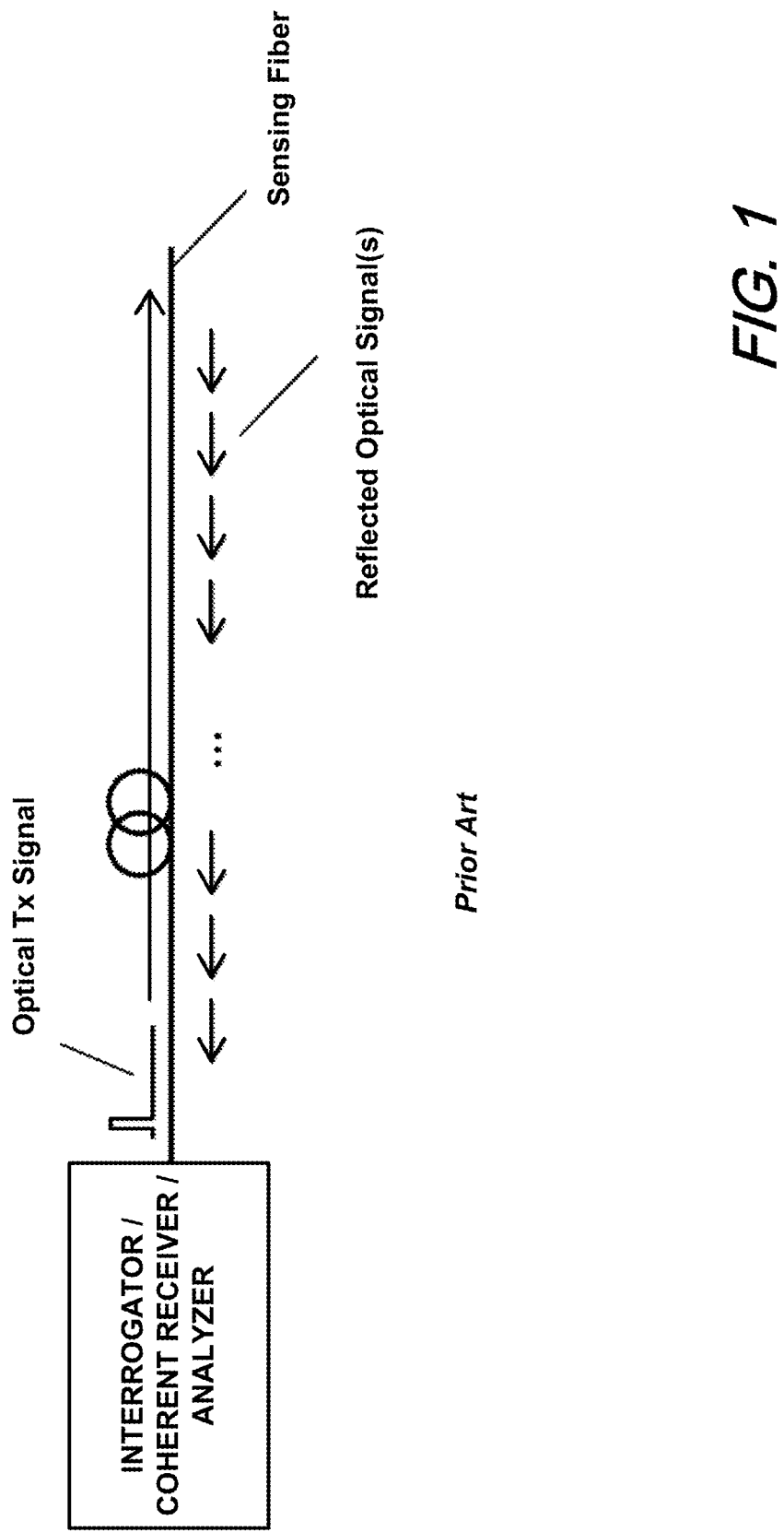
FIG. 1 is a schematic diagram of an illustrative DOFS arrangement as is known in the art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—we again note that in recent years, distributed optical fiber sensing (DOFS) systems including distributed vibration sensing (DVS), distributed acoustic sensing (DAS), and distributed temperature sensing (DTS) have found widespread acceptance in numerous applications including—but not limited to—infrastructure monitoring, intrusion detection, and earthquake detection—among others. DAS and DVS systems detect vibrations and capture acoustic energy along optical fibers wherein fiber optic cables are utilized operate as a distributed acoustic sensor. DTS—like DAS and DVS—uses fiber optic sensor cables, typically over lengths of several kilometers, that function as linear temperature sensors. The result is a continuous temperature profile along the entire length of the sensor cable.

Acoustic energy backward Rayleigh scattering effects are used to detect changes in the fiber strain, while the fiber itself acts as the transmission medium for conveying the optical sensing signal back to an interrogator for subsequent analysis.

With reference to FIG. 1 which is a schematic diagram of an illustrative distributed fiber optic sensing system generally known in the art in which an optical fiber cable is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes.

DTS utilizes the Raman effect to measure temperature. An optical laser pulse sent through the sensor fiber results in scattered light reflecting to the transmitting end, where it is detected, analyzed, and temperature information is determined therefrom. The intensity of the Raman scattering is a measure of the temperature along the fiber. The Raman anti-Stokes signal changes its amplitude significantly with changing temperature, while the Raman Stokes signal is relatively stable.

At the interrogator, reflected signals are converted to an electrical domain and processed inside the interrogator. Based on pulse injection time and the time a reflected signal is detected, the interrogator determines at which location(s) along the fiber a signal is coming from, thus able to sense the temperature of each location along the fiber.

We note that Raman-based DTS advantageously operates at a range of several tens of kilometers with a spatial resolution of around 1 meter. When the temperature sensing distance operates over such an extended distance, the data security problem noted previously is particularly acute.

Advantageously, our inventive systems and methods according to aspects of the present disclosure provide for coded DTS data security without significantly adding a computational burden as compared to conventional data encryption methods that are employed in the art as some interrogation/computing/analysis systems known in the art.

Figure 2:
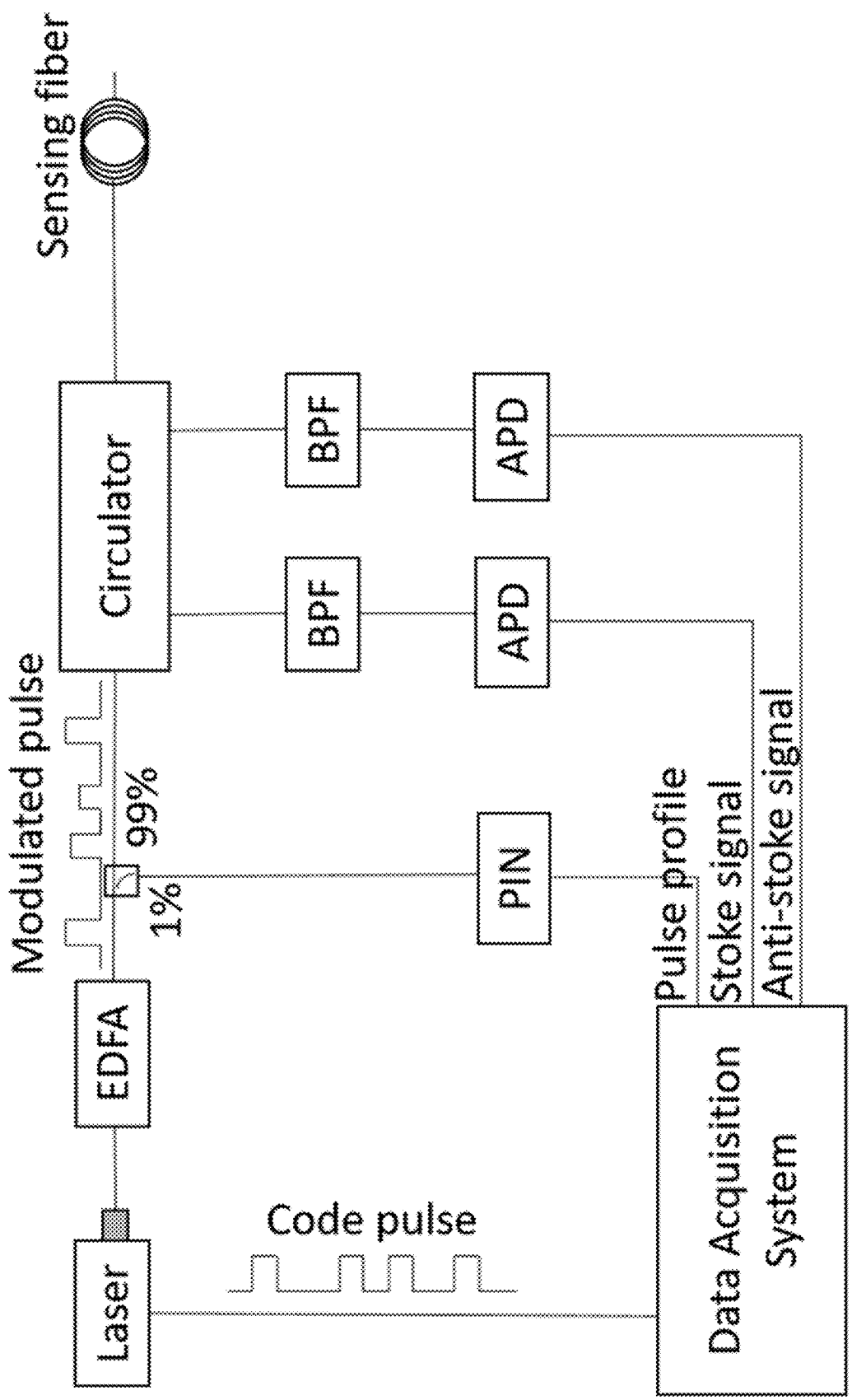
FIG. 2 is a schematic diagram of an illustrative coded distributed temperature sensing (DTS) system according to aspects of the present disclosure.

FIG. 2 is a schematic diagram of an illustrative coded distributed temperature sensing (DTS) system according to aspects of the present disclosure. As may be observed from that figure, the coded DTS system includes a sensing fiber to which is optically connected via circulator an interrogator/analyzer illustratively including a laser, an erbium doped fiber amplifier and data acquisition system that receives as input puls profile, Stokes signals, and Anti-Stokes signals. The Stokes, and Anti-Stokes signals result from Rayleigh scattering of pulse(s) directed into the sensing fiber by the circulator, which also redirects the scattered light to band pass filters and photodiodes (Avalanche Photo Diodes are shown in the figure). The data acquisition system also directs specific code pulse(s) to the laser, which is modulated onto output pulses that are directed into the sensing fiber as interrogation pulses.

As those skilled in the art will understand and appreciate, our coded DTS interrogator—as compared to a conventional DTS system—outputs a sequence of predefined pulse(es) (pulse code) in a given measurement cycle. This pulse code is a long binary 0-and-1 sequence, similar to a pseudo-random key used in conventional data encryption.

We note that such a pulse code—while offering certain advantages for a coded DTS application—is limited in that it is not suitable for direct use as an encryption key. Notwithstanding, this coded pulse modulates the laser intensity in the time domain. Subsequently, the modulated laser output light is amplified through the effect of the non-linear optical amplifier (EDFA). The output pulse amplitude is further affected by affected by code type, pulse profile, EDFA characteristics and other factors. As a result, the actual pulse profile so produced is unique for each interrogator and each system configuration as exhibited at each run time. As shown in FIG. 2, a small portion of the modulated pulse light is tapped from the modulated pulse signal output by the EDFA, and code profile data is detected/collected by a PIN photodiode detector. The amount of light tapped from the modulated pulse signal output by the EDFA is small, i.e., <=1%. Those skilled in the art will appreciate that a PIN photodiode has an intrinsic—very lightly doped—semiconductor region sandwiched between a p-doped and n-doped regions. The output of the PIN photodiode is used by the data acquisition system/interrogator to generate the key which is used to encrypt the static data namely, the pulse code and pulse profile, which are static data for each run time, while the measured raw data varies during the measuring time which incorporates temperature information.

Figure 3:
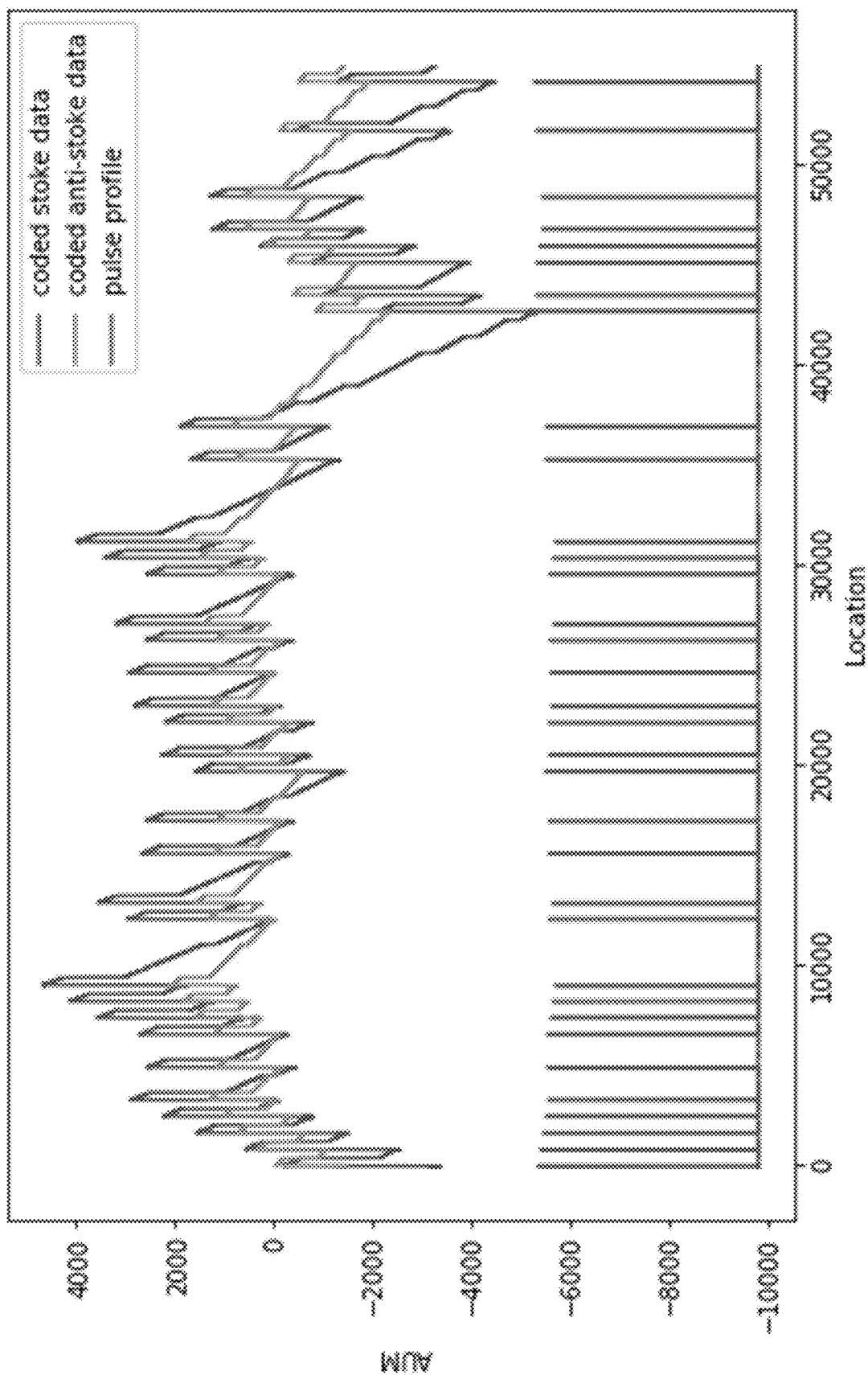
FIG. 3 is a pulse profile plot measured with PIN detector and raw coded DTS data according to aspects of the present disclosure.

FIG. 3 is a pulse profile plot measured with PIN detector and raw coded DTS data according to aspects of the present disclosure.

Figure 4:
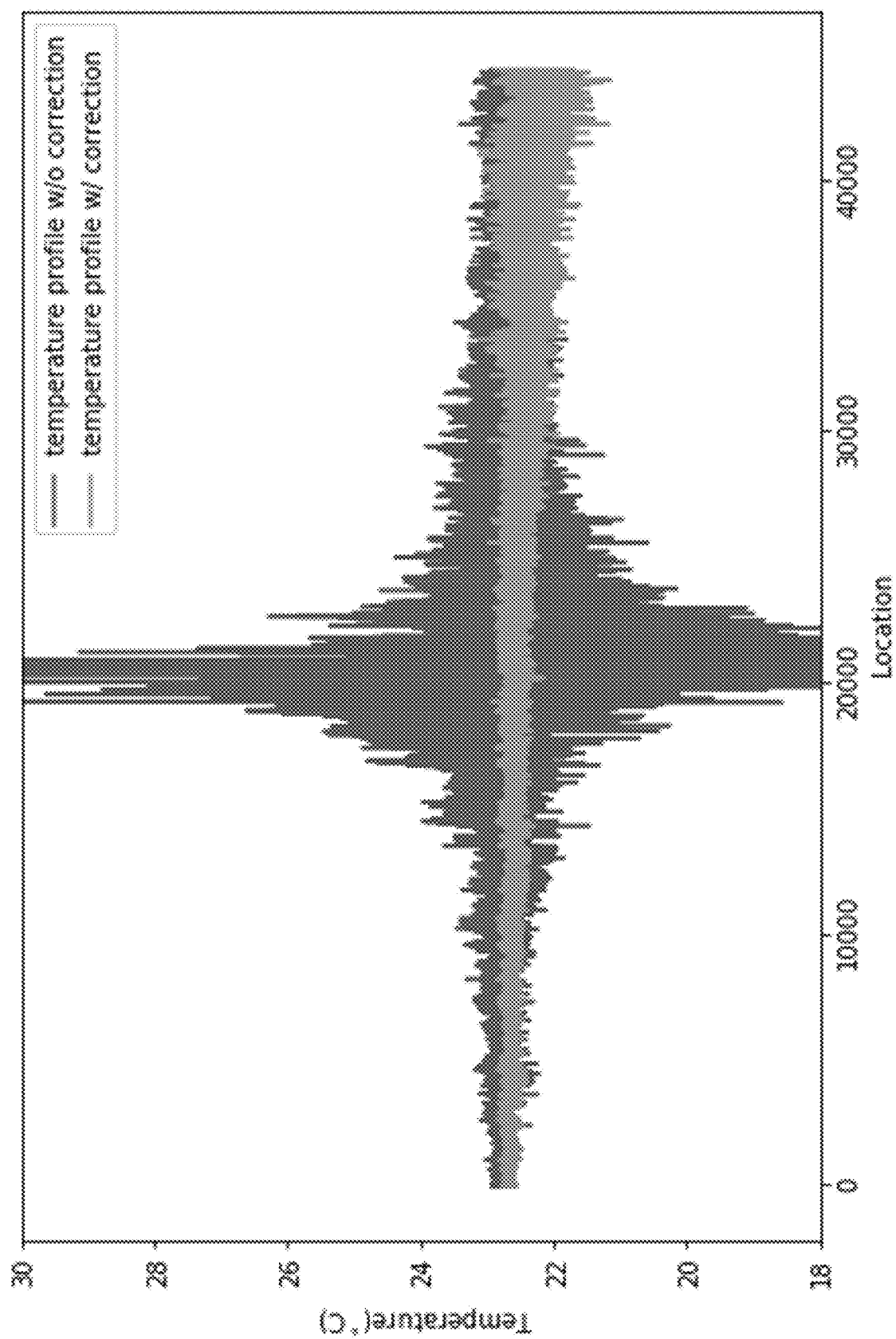
FIG. 4 is a plot illustrating reconstructed temperature data with and without pulse profile information according to aspects of the present disclosure.

FIG. 4 is a plot illustrating reconstructed temperature data with and without pulse profile information according to aspects of the present disclosure.

As those skilled in the art will readily appreciate, our inventive method and apparatus treats the pulse code and pulse profile information as a key for traditional key encryption techniques and subsequently shares the key with authorized users. Authorized users can use this key information—for example—to retrieve DTS temperature information on a remote computer receiving a continuous feed of raw data.

Operationally, at each DTS system boot-up time, pulse profile information and applied code files are generated by the interrogator and encrypted using generic file encryption technique including RSA or AES algorithms and the key generated from the PIN output. As this part of information is static for each run, time overhead to transfer this additional information is neglectable when compared to whole measurement time. Authorized users will request this profile information each time the system boot up and start the normal data acquisition process.

Figure 5:
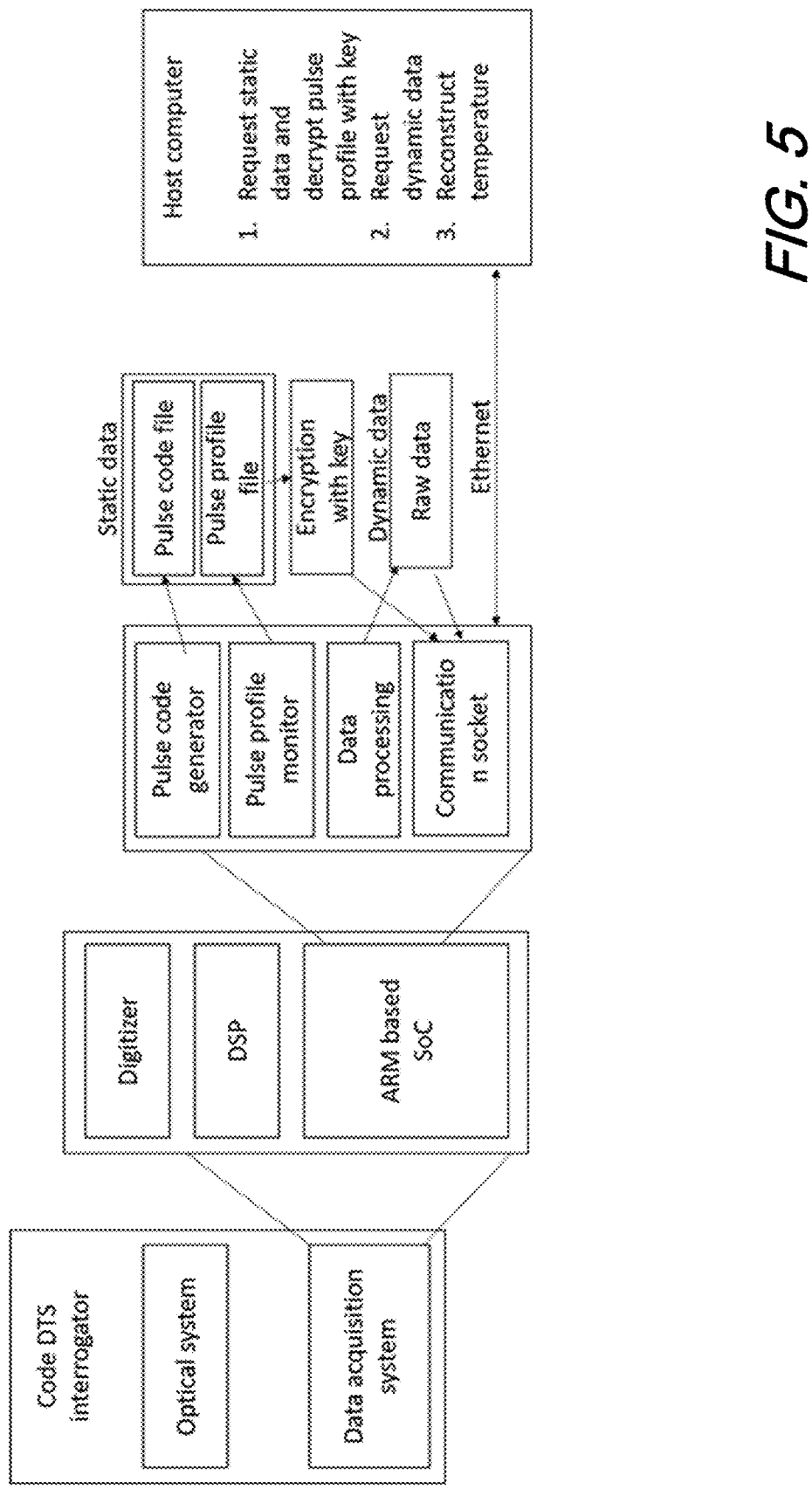
FIG. 5 is a schematic diagram illustrating a sequence of operation for data security protection according to aspects of the present disclosure.

FIG. 5 is a schematic diagram illustrating an illustrative system providing for DTS data security protection according to aspects of the present disclosure. As may be observed from that figure, a system according to aspects of the present disclosure may include a coded DTS interrogator and host computer. The coded DTS interrogator provides pulse profile data encryption and raw data acquisition that may be acquired by an authorized user.

The interrogator includes optical components that produce modulated laser light pulse(s) (interrogation pulses) which—when injected into a sensory fiber—stimulate the fiber that result in Stokes and Anti-Stoke signals resulting from Raman scattering. The signals are detected/converted to electrical signal through the effect of APD detectors. The interrogator also provides pulse code generation, electrical signal digitization, signal processing (DSP) and software related function. Such software may run on an embedded platform, i.e., ARM based SoC. Software controls may further control other operational aspects including pulse code generator, pulse profile monitor, data processing and communications.

Operationally, the pulse code generator controls the code pulse to apply to the system and maintains pulse code files. The pulse profile monitor acquires PIN detector signal to construct pulse profile file. Those two types of files are static that do not change after system boot-up and are encrypted and provided to authorized users at system initialization/startup. The authorized users then decrypt these files, which are used to "decrypt" the raw DTS data that is subsequently provided in real time.

Figure 6:
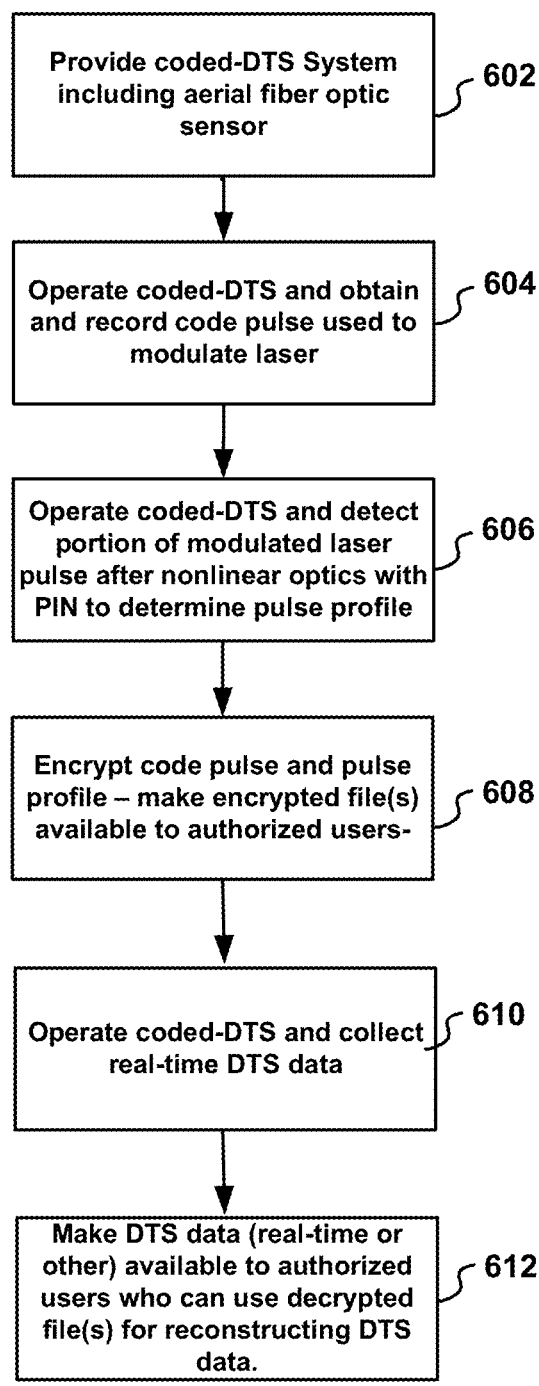
FIG. 6 is a schematic flow chart diagram illustrating a sequence of operation according to aspects of the present disclosure.

FIG. 6 is a schematic flow chart diagram illustrating a sequence of operation according to aspects of the present disclosure. With reference to this figure there is shown an illustrative overall operation according to aspects of the present disclosure. At Step 602, a coded-DTS system including coded interrogator and data acquisition and data analysis system is provided including sensing fiber and nonlinear components including amplifiers for amplifying interrogation light. At step 604, the coded-DTS system is operated, and the code pulse used to modulate the laser is recorded. At Step 606, the coded-DTS is operated, and a portion of the modulated laser light is tapped/redirected prior to its direction to the sensor fiber. This tapped/redirected light is detected with a PIN to detect/determine pulse profile of the modulated laser light after the non-linear effects introduced by any EDFA, etc. At Step 608, the code pulse and pulse profile file(s) are encrypted and made available to authorized users. At Step 610, the coded-DTS is continued to be operated using the recorded code pulse and pulse profile resulting in real-time DTS data being produced. At step 612, the DTS data so produced (real-time and/or stored data) are made available to the authorized user(s) who may use decrypted code pulse and pulse profile file(s) to reconstruct the DTS data and extract temperature data therefrom. Those skilled in the art will understand and appreciate that such file(s) and DTS data may be made available to the authorized users via other systems—or by any network arrangement convenient and capable of providing such data to the authorized user(s).

At this point, while we have presented this disclosure using some specific examples, those skilled in the art will recognize that our teachings are not so limited. Accordingly, this disclosure should be only limited by the scope of the claims attached hereto.

The invention claimed is:

1. A method for securing temperature data generated by a coded-distributed temperature sensing (coded-DTS) system, the method comprising:
   providing the coded-DTS system including a coded-DTS interrogator/analyzer in optical communication with an optical sensing fiber;
   operating the coded-DTS system and obtaining and recording code pulse(s) used to modulate a laser included in the coded-DTS interrogator/analyzer;
   operating the coded-DTS system and obtaining pulse profile(s) of modulated laser light produced by the laser;
   encrypting the code pulse(s) and pulse profile(s) so obtained and make the encrypted code pulse(s) and pulse profile(s) available to an authorized user;
   operating the coded-DTS system and collect real-time DTS temperature data along a length of the optical sensing fiber;
   making the collected DTS temperature data available to the authorized user for reconstructing the collected DTS temperature data along the length of the optical sensing fiber using the encrypted code pulse(s) and pulse profile(s) after their decryption.

2. The method of claim 1 wherein a the DTS temperature data made available to the authorized user is made available in real-time with respect to its acquisition.

3. The method of claim 1 wherein the real-time DTS temperature data is made available to the authorized user via a remote server computer distinct from the coded-DTS system.

* * * * *